United States Patent [19]

Kendzior

[11] 4,027,390

[45] June 7, 1977

[54] SAW BLADE

[75] Inventor: Leo J. Kendzior, Meriden, Conn.

[73] Assignee: Jarvis Products Corporation, Middletown, Conn.

[22] Filed: Feb. 17, 1976

[21] Appl. No.: 658,282

Related U.S. Application Data

[63] Continuation-in-part of Ser. No. 520,056, Nov. 1, 1974, abandoned.

[52] U.S. Cl. .................................. 30/355; 83/835; 17/23
[51] Int. Cl.² ...................... B26B 9/02; B27B 23/00
[58] Field of Search ............... 83/835, 661; 30/355, 30/392, 393, 394; 17/23

[56] References Cited

UNITED STATES PATENTS

| | | | |
|---|---|---|---|
| 378,203 | 2/1888 | Lohman | 83/835 |
| 877,146 | 1/1908 | Ward | 83/835 |
| 2,692,621 | 10/1954 | Steiner | 30/393 |
| 2,825,968 | 3/1958 | Baer | 30/355 |
| 3,001,287 | 9/1961 | Rocovich | 30/355 |

FOREIGN PATENTS OR APPLICATIONS 886,832   1/1962   United Kingdom ................. 30/355

*Primary Examiner*—Al Lawrence Smith
*Assistant Examiner*—J. C. Peters
*Attorney, Agent, or Firm*—DeLio and Montgomery

[57] ABSTRACT

A straight saw blade adapted for rapid reciprocation, the blade being tapered in cross-section across a substantial part of its width such that it is thinnest at or near the points of the teeth and substantially thicker throughout the portion adjacent to the back. The blade is stiff enough to be operated from one end, without tension.

3 Claims, 6 Drawing Figures

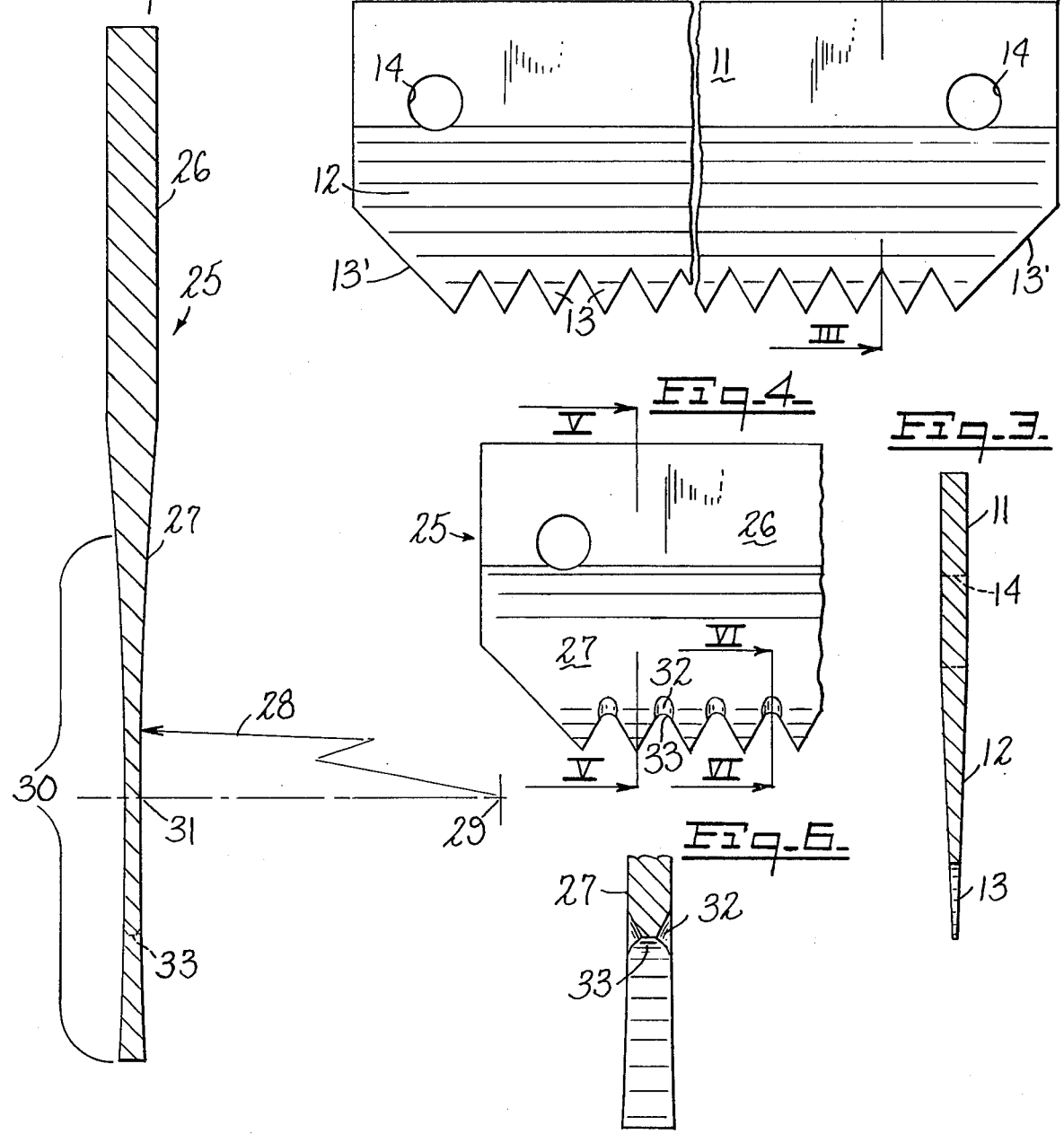

SAW BLADE

This application is a continuation-in-part of application Ser. No. 520,056, filed Nov. 1, 1974, now abandoned.

This invention relates to a straight saw blade adapted for rapid reciprocation, as by a motor attached to one end, the blade being tapered in cross-section across a substantial part of its width (e.g., more than half) and being thinnest at or near the points of the teeth. It is substantially thicker throughout the portion adjacent the back, the thickness in this region being preferably uniform and equal to the maximum thickness of the tapered portion.

This blade is expressly designed for use in a heavy-duty hydraulically powered saw for splitting animal carcasses, wherein the saw blade is about 30 inches long and is driven, from one end, at speeds up to 2200 oscillations per minute.

Reciprocating saw blades have heretofore been made of flat steel and, in order to have enough rigidity to be practical, the thickness had to be substantial (e.g., at least 0.065 to 0.070 inches). When a beef carcass was split by such a saw blade an amount of bone and meat corresponding to the blade thickness was removed and lost. Additionally, a flat blade having only the thickness named was still relatively flexible and flexed or "whipped" substantially in use on the pushing stroke. At high speeds of oscillation this increased greatly the noise level of the operation, raising it beyond the OSHA DBA level rating. Due to metal fatigue the flat blades have a tendency to break, with the danger of serious injury to the operator.

It is accordingly an object of the invention to provide a saw blade of tapered cross-section having a thin cutting edge, whereby the amount of bone and meat lost in the cutting operation is reduced.

It is another object to provide a saw blade with increased rigidity to resist flexing and thereby reduce the noise level of the sawing operation.

It is a further object to provide a thin edged rigid saw blade which can be operated smoothly at high cutting speeds.

It is still a further object to provide a saw blade having a cutting edge of reduced thickness for easier cutting.

It is yet another object to provide a saw blade having a thin cutting edge wherein the portion adjacent the teeth is slightly hollow-ground.

The invention accordingly comprises an article of manufacture possessing the features, properties, and the relation of elements which will be exemplified in the article hereinafter described, and the scope of the invention will be indicated in the claims.

A practical embodiment of the invention is shown in the accompanying drawing wherein:

FIG. 1 is a somewhat diagrammatic side elevation of a carcass splitting saw of the type in which the improved saw blade intended to be used;

FIG. 2 is a side elevation of the saw blade, part of its length being cut away;

FIG. 3 is a vertical section on the line III—III of FIG. 2.

FIG. 4 is a side elevation of one end portion of a modified form of saw blade;

FIG. 5 is a vertical section on an enlarged scale, taken on the line V—V of FIG. 4; and FIG. 6 is a detail vertical section on the line VI—VI of FIG. 4.

Referring to the drawing, and particularly FIGS. 1 to 3, the saw blade 10 comprises a straight strip of band saw steel stock having a back portion 11 of uniform thickness, greater than that of blades heretofore in use, and a tapered portion 12 with teeth 13 cut into the thin edge of the tapered portion. The blade is tapered on both sides, i.e., the surface planes of the tapered portion angled symmetrically with respect to the median plane of the blade. The tips of the teeth may suitably have a thickness which is about half the thickness of the back portion 11. The teeth are straight, not set laterally, symmetrical, and filed straight across so that their edges lie in planes perpendicular to the plane of the blade. Holes 14 are provided near each end of the blade for mounting the blade in the saw, and the lower corners are preferably beveled as shown at 13'.

A form of carcass splitting saw in which the blade 10 is intended to be used is shown in FIG. 1, by way of example. This saw includes a hydraulic motor, indicated generally at 15, driving an eccentric 16 to reciprocate the link 17 and rock the bell crank 18. The free end of the bell crank is connected at 19 to one end of the blade 10, the other end of the blade being engaged at 20 with a link 21 housed in the distal end 22 of the saw. The portion of the blade adjacent to the link 21 is housed and guided in the downwardly extending portions 23 of the saw casing. About half of the length of the blade is fully exposed, at 24, between the respective end portions of the saw. Saw handles, support cable, hose connection and other details of the saw are not shown, being conventional.

Upon actuation of the motor 15, the bell crank is rocked and the saw blade is pushed and pulled along a short, almost straight oscillatory path.

The saw blade 10 is typically about 30 inches long, as noted above, and is three inches wide, from the back edge to the tooth points. The back portion 11 has a width of about half the distance from the back to the base of the teeth (e.g., 1¼ inches). The teeth are cut at 60° angles between their edges and are spaced two to the inch. In the tapered portion 12 the thickness of the blade varies from about 0.05 inches (±0.005 inches) at the points of the teeth to about 0.109 inches at the line of junction between portions 11 and 12. The blade may suitably be hardened to 40–45 R "c".

Field testing of the tapered saw blade described above has shown that it performs the cutting operation effectively, with the advantages referred to, but that the outward taper from the cutting edge upward tends to cause a smearing of removed material, such as fat and the like, across the cut portion of the bone (i.e., the vertebrae). Some users may consider this to be objectionable, because of discoloration of the bone surfaces, and the expedient shown in FIGS. 4 to 6 may be resorted to in order to overcome the smearing tendency.

In the modified blade 25 of FIGS. 4 to 6 the back portion 26 has a uniform thickness like the portion 11 in FIGS. 1 to 3, but the tapered portion 27 is slightly hollow ground, on a long radius 28 (e.g., about 6 feet) centered at a point 29 somewhat above the base of the teeth (e.g., 1 inch above). This creates a zone 30 adjacent the cutting edge and extending upwardly therefrom, where the blade has a varying reduced thickness, which may be from 0.002 to 0.008 inches (maximum at 31) less than the thickness at the points of the teeth. It has been found that this blade cuts more easily and cleaner than the single tapered blade of FIGS. 1 to 3, and eliminates the smearing of the bone, while retaining the ability to stand rapid reciprocation (2200 R.P.M.) with a strong rigid back portion and teeth having a cutting thickness of only about 0.050 to 0.060 inches.

The root portions of the teeth are shown as being modified by bevel grinding (as with a 0.25 inch cutter) each side of the blade at its root, as shown at 32, and the tooth working faces may be joined by a small radius 33 instead of meeting at a sharp corner.

While a knife blade severs a mass by "disconnecting" its parts along the blade edge and pushing the parts aside, the teeth of a saw act to remove and discard all the material of the mass in their path. The tapered saw blades described above have a cutting tooth edge which is thinner by about one-third than the cutting tooth edge of the previously used flat blade, so that it removes less material, i.e., wastes less, while requiring less power to cut through a given distance. The thicker back portions 11 or 26 give the blade substantially greater rigidity so that flexing is minimized and the narrowness of the teeth (which move through the material easier than wider teeth would) contributes to the reduction in flexing. The bone and meat through which the blade is designed to cut, separate as the cutting progresses without causing the blade to bind.

It will thus be seen that the objects set forth above, among those made apparent from the preceding description, are effeciently attained and, since certain changes may be made in the above article without departing from the spirit and scope of the invention, it is intended that all matter contained in the above description and shown in the accompanying drawing shall be interpreted as illustrative and not in a limiting sense.

I claim:

1. A straight saw blade adapted for reciprocation without tension in a carcass splitting saw, comprising a back portion having a back edge and an integral transversely tapering portion integral with the back portion and having a cutting edge parallel to the back edge, the back portion having a substantially uniform thickness, the tapering portion having its greatest thickness at its line of junction with the back portion and being hollow ground with its least thickness along a line slightly spaced from its cutting edge, saw teeth being formed in said cutting edge, each said tooth being adapted to remove a portion of the material being sawed, and the width of the back portion being no greater than about half of the distance from the back edge to the base of the teeth.

2. A saw blade according to claim 1 wherein said line of least thickness is spaced from the base of the teeth by a distance of about one-third of the width of the blade.

3. A saw blade according to claim 2 wherein the root portions of the teeth are bevel ground, the tooth working faces being joined by a small radius.

* * * * *